(12) United States Patent
Tan et al.

(10) Patent No.: US 8,040,945 B1
(45) Date of Patent: Oct. 18, 2011

(54) SYSTEM AND METHOD FOR ENCODING A SINGLE VIDEO STREAM AT A PLURALITY OF ENCODING RATES

(75) Inventors: Wai-tian Tan, Palo Alto, CA (US); Gene Cheung, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 1460 days.

(21) Appl. No.: 11/414,668

(22) Filed: Apr. 28, 2006

(51) Int. Cl.
*H04N 7/18* (2006.01)

(52) U.S. Cl. ............................ 375/240.01; 375/240.26

(58) Field of Classification Search . 375/240.01–240.29
See application file for complete search history.

(56) References Cited

U.S. PATENT DOCUMENTS 7,693,220 B2 * 4/2010 Wang et al. ................ 375/240.2

* cited by examiner

*Primary Examiner* — Andy Rao

(57) ABSTRACT

A method for encoding a plurality of video frames of a single data stream at a plurality of encoding rates is provided. The method includes accessing a first video frame associated with the single data stream and encoding the first video frame at a first encoding rate. The method further includes accessing a second video frame associated with the single data stream and encoding the second video frame at a second encoding rate.

20 Claims, 5 Drawing Sheets

100

US 8,040,945 B1

SYSTEM AND METHOD FOR ENCODING A SINGLE VIDEO STREAM AT A PLURALITY OF ENCODING RATES

TECHNICAL FIELD

The field of the present invention relates to video processing. More particularly, embodiments of the present invention are related to switching encoding rates within a single data stream.

BACKGROUND

Transmission rate control is one of the most important modules in video coding and streaming over resource-limited networks. Failure to effect transmission rate control results in data loss. Many advances in video compression have been made to address the artifacts caused by data losses in the transport medium. These advances can be categorized into two classes. The first class attempts to address error propagation caused by temporal prediction, and includes techniques such as the use of periodic intra-frames and multiple description coding. The second class attempts to minimize the amount of received data that is rendered useless by data loss. Examples include "video packet" (resync markers) and reversible VLC code. Error concealment is a common technique that sits between these two classes.

Beyond the traditional Intra-frame (I-Frame) and the Inter-frame (P-frame) coding, a new frame type S-frame was introduced in the new video coding standard H.264. There are two types of S-frames, namely, the SI frame which is an intra frame encoded, and the SP frame which employs temporal prediction.

An improved system and method for transmission rate control utilizing S-frames and SP frames would be an improvement over conventional encoding and transmission systems and methods.

SUMMARY OF THE INVENTION

Embodiments of the present invention include a method for encoding a plurality of video frames of a single data stream at a plurality of encoding rates is provided. The method includes accessing a first video frame associated with the single data stream and encoding the first video frame at a first encoding rate. The method further includes accessing a second video frame associated with the single data stream and encoding the second video frame at a second encoding rate.

BRIEF DESCRIPTION OF THE DRAWINGS

The above and other objects and advantages of the present invention will be more readily appreciated from the following detailed description when read in conjunction with the accompanying drawings, wherein.

DETAILED DESCRIPTION OF THE INVENTION

Reference will now be made in detail to embodiments of the present invention, a system and method for drift free media streaming, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

As stated above, a new frame type S-frame was introduced in the new video coding standard H.264. There are two types of S-frames, namely, the SI frame which is an intra-encoded frame, and the SP frame which employs temporal prediction. A key characteristic of the SP frame, P, is that its reconstructed picture can be perfectly reproduced by another SP frame, S, even though S might predict from a different frame than P. Embodiments of the present invention use S-frames in a video stream to switch between encoding rates within the single video stream.

Embodiments of the present invention include methods and systems of streaming video with S-frames to effect adaptation to packet losses. One embodiment of the invention provides no extended period of "drift", where picture degradation persists for extended period of time when bandwidth has to be lowered from a previously higher bit-rate. Another embodiment of the invention provides multiple trade-off points between bandwidth and transient picture degradation. Embodiments of the present invention also include the ability to support point-to-multipoint applications where a single point can simultaneously stream content at different bit-rates to multiple clients and dynamically change bit-rates within the same stream.

Embodiments of the present invention include methods and systems of adapting a media stream with S-frames in response to packet losses. Embodiments of the present invention utilize S-frames to switch bit-rates within a single compressed bit-stream, as shown in FIG. 1A.

Figure 1A:
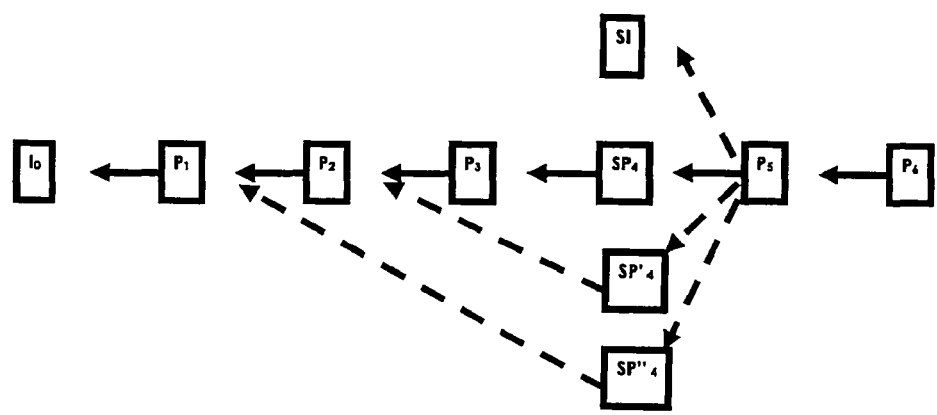
FIG. 1A is an illustration of an exemplary single video stream encoded at a plurality of encoding rates in accordance with embodiments of the present invention.

FIG. 1A is an illustration of an exemplary usage of SP-frames for error-resilience in a video stream 100. Embodiments of the present invention use SP frames to switch within a single video stream. In one embodiment of the invention, video stream 100 represents a stored copy of a video stream and includes frames I0, P1, P2, P3, SP4, P5, and P6. Frames SI, SP'4 and SP"4 are frames that can be either generated on the fly or can be stored in a memory. Frames SI, SP'4 and SP"4 are used when frames are skipped (e.g., encoding rate is reduced). Embodiments of the present invention periodically skip frames to reduce drift when streaming video. By skipping frames, the encoding rate is effectively reduced within the stream.

In one embodiment of the invention, a video sequence of I0, P1, P2, P3, SP4, P5, P6 is normally transmitted. Frame four (SP4) is encoded as an SP-frame, whose reconstructed picture can be perfectly reproduced by other S-frames, such as SI, SP', and SP". The frame SI is intra-coded, and SP' and SP" has reference frames P2 and P1, respectively. An important consequence is that for the reconstruction of P5, and therefore subsequent frames, it makes no difference whether P5 is predicted from SP4, SI, SP' or SP". For example, if I0 and P1 is received, but P2 and SP4 are lost, the transmitter has the option of retransmitting all of the lost frames and then P5 or it can retransmit SP" or SI followed by P5.

Persistent retransmission ensures that all frames are perfectly reconstructed at the receiver at the expense of having no ability to adapt to application needs. When the byte size of a secondary or switching SP frame is smaller than the byte size of the lost packets, it is sometimes preferable to transmit the smaller SP frame at the expense that not all frames are perfectly reconstructed. In the context of FIG. 1, where P2 and SP4 are lost, if the size of SP" is smaller than the sum size of P2 and SP4, then sending SP" is cheaper in terms of bytes to stop error propagation at P5, but intermediate frames P2, P3 and SP4 cannot be reproduced perfectly.

The SP4 frame is a frame that can be switched to (when changing encoding rates). For example, after transmission of P3, suppose that P2 is lost. The sender has a number of options at this point. It could retransmit the lost packets, or it could transmit SP"4 followed by P5, P6. The main advantage of retransmission is that every frame will be perfectly reconstructed. The main advantage of sending SP"4 is twofold. The first advantage is that sending SP"4 may incur fewer bits, e.g., if SP"4 is smaller than the combined size of P2 and SP4. The second advantage is that it is more likely to meet a display deadline by skipping frames.

Advantage one is achieved through the property of S-frames that allow perfect reconstruction of the primary SP-frame even though secondary SP-frames use different reference frames. Advantage two is achieved by having multiple switching points as illustrated by SP'4 and SP"4 in FIG. 1. In one embodiment of the invention, any frame of a video stream can be a switch point, however, the "switch to" point is an S-frame within the stored video stream. In one embodiment of the invention, the SP frames in the video stream is pre-coded. Frames SI, SP' and SP" could be pre-encoded or can be generated on the fly according to the encoding rate change. The S-frame in the stored video stream is replaced with the new S-frame when frames are skipped and the encoding rate is changed.

Figure 1B:
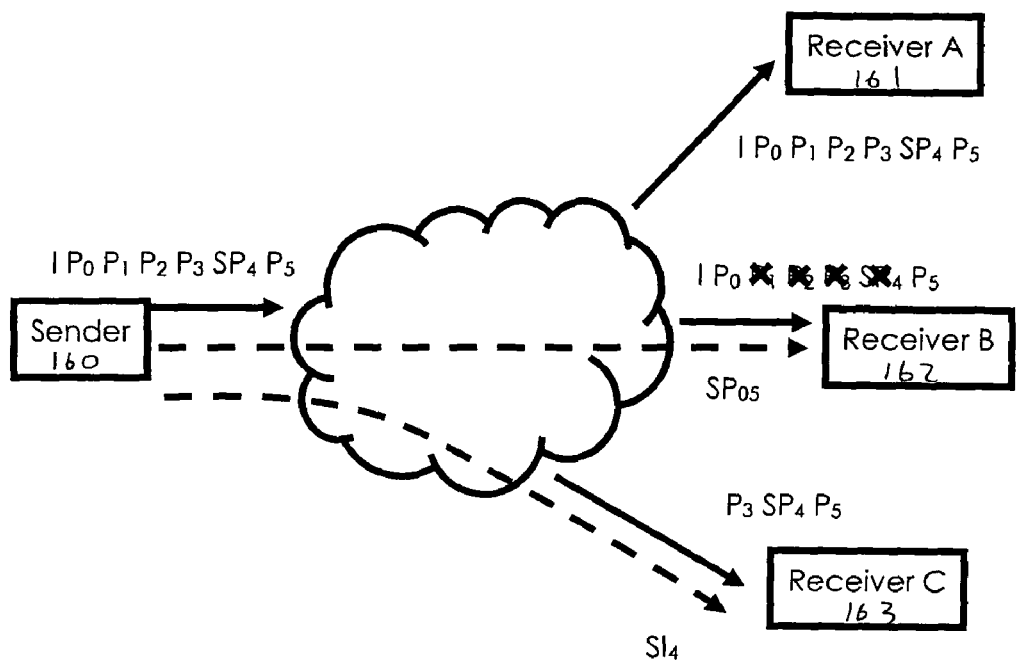
FIG. 1B is an illustration of an exemplary encoding scenario in which a single sender is communicating live to multiple receivers wherein the sender can change encoding rates within any one of the streams to the receivers in accordance with embodiments of the present invention.

FIG. 1B is an illustration of an exemplary encoding and transmission scenario in which a single sender 160 is communicating live to multiple receivers (receiver A 161, receiver B 162 and receiver C 163). Examples include video conferencing and remote instruction where a single instructor maintains low latency one-way video to multiple students, who has access to a phone for asking questions. In this scenario, a sender 160 sends the sequence I, P0, P1, P2, P3, SP4, P5. The use of occasional SP frame is known to incur only a small penalty in extra bits, even though this penalty applies to all receivers. Suppose receiver A 161 suffers no packet loss, therefore no further action is required.

However, suppose receiver B 162 observers losses of packets P1, P2, P3, and SP4, and instead of retransmitting all these packets which are likely to be late and cost many bits, the sender 160 can simply send a special patch frame SP05 and receiver B 162 can continue decoding P5 without drift. Suppose receiver C 163 joins the session late and can receive a special SI4 frame from sender 160 and start decoding from that frame. An alternate implementation would require frequent use of I-frames, which incurs unnecessarily high bit-rate for users like receiver A 161.

Figure 2:
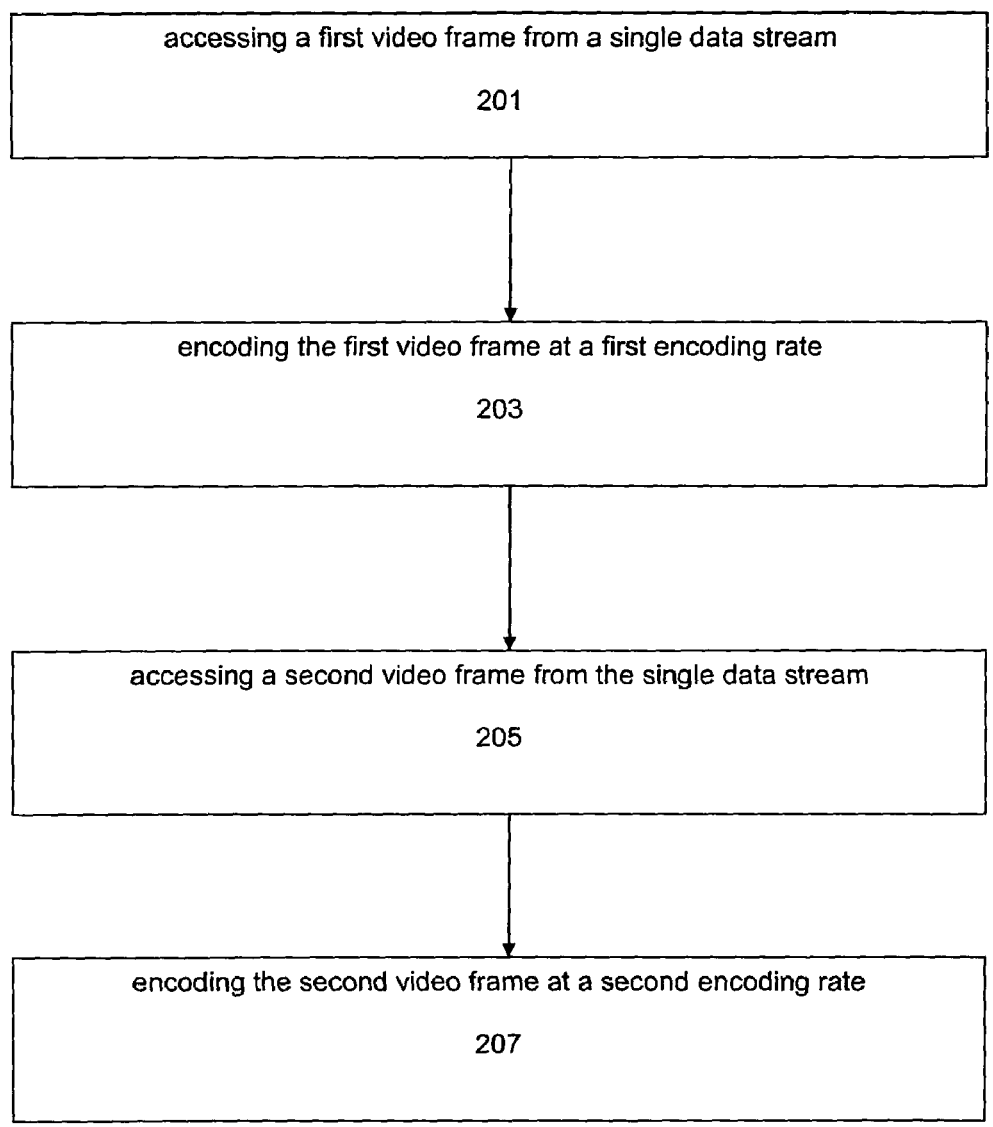
FIG. 2 is a flow diagram of an exemplary method of encoding a single video stream at a plurality of encoding rates in accordance with embodiments of the present invention.

FIG. 2 is a flow diagram of an exemplary method 200 of encoding a single video stream at a plurality of encoding rates in accordance with embodiments of the present invention.

At step 201, method 200 includes accessing a first video frame associated with a single data stream. In one embodiment of the invention, switching can occur from any frame within the single video stream and switches to an S frame. In one embodiment of the invention, the S frame is generated on the fly according to where in the stream the encoder is switching to.

At step 203, method 200 includes encoding the first video frame at a first encoding rate. In one embodiment of the invention, the first video frame is encoded by a primary encoder. In one embodiment of the invention, the primary encoder operates like a typical I-frame encoder with an added second quantization/de-quantization combination that quantizes and de-quantizes the primary SP frame (e.g., the point switching to) in the single video stream before a frame buffer.

At step 205, method 200 includes accessing a second video frame associated with the single data stream. In one embodiment of the invention, the second video frame is the primary SP frame (e.g., the SP frame in the single video stream). In one embodiment of the invention, the second frame is generated based on a primary S frame already in the single video stream.

At step 207, method 200 includes encoding the second video frame at a second encoding rate. At this step, the encoding rate for the single video stream is changed from a first rate to a second rate. In one embodiment of the invention, frames of the single video stream are skipped. The number of frames skipped depends on numerous factors, such as the difference in the two encoding rates.

Figure 3:
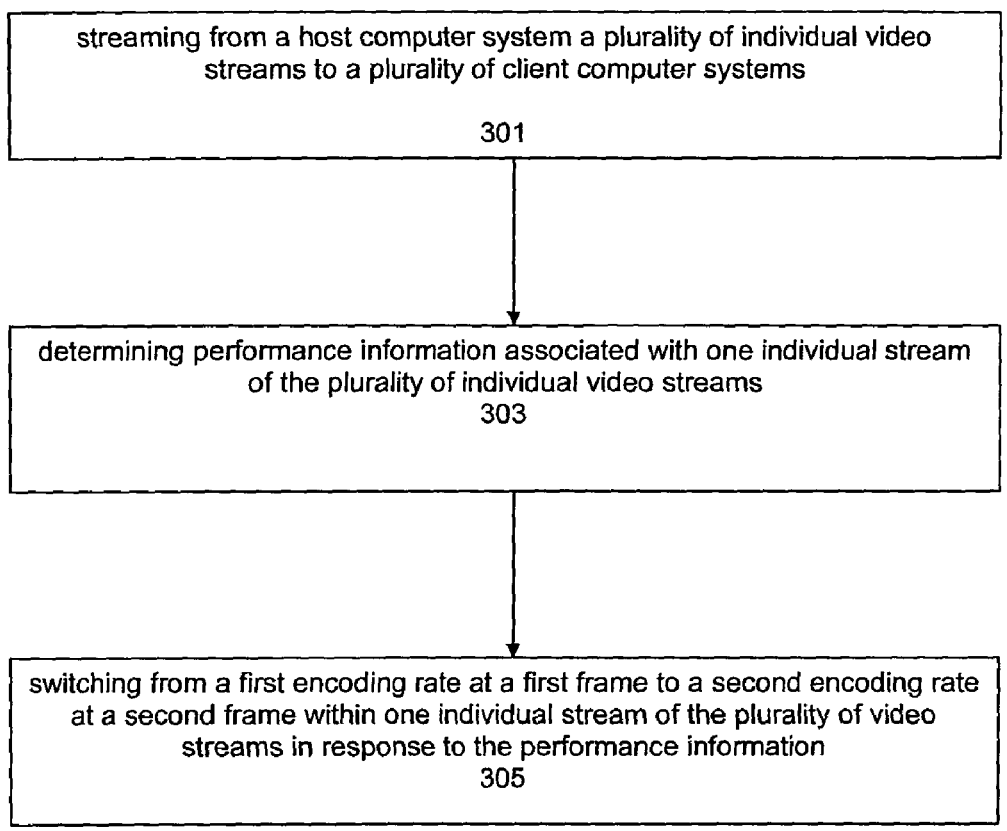
FIG. 3 is a flow diagram of an exemplary method of streaming a plurality of video streams at a plurality of encoding rates within one or more of the streams in accordance with embodiments of the present invention.

FIG. 3 is a flow diagram of an exemplary method 300 of streaming a plurality of video streams at a plurality of encoding rates within one or more of the streams in accordance with embodiments of the present invention.

At step 301, method 300 includes streaming from a host computer system a plurality of individual video streams to a plurality of client computer systems. In one embodiment of the invention, the streaming is performed in real time. In another embodiment of the invention, the streaming is non-real time. In one embodiment of the invention, each of the plurality of client computer systems may or may not start/end the session at the same time.

At step 303, method 300 includes determining performance information associated with one individual stream of the plurality of individual video streams. In one embodiment of the invention, the performance information could be performance information associated with the sender, receiver or any intermediary components between the sender and receiver. The performance information could also include characteristics associated with the communication channel between the sender and the receiver.

Figure 4:
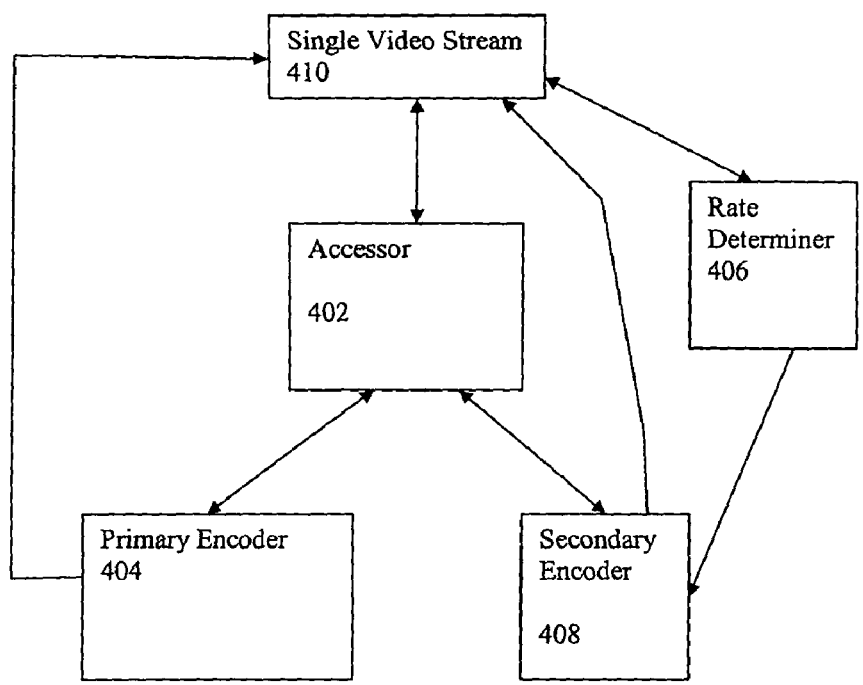
FIG. 4 is a block diagram of an exemplary system for encoding a video stream at a plurality of encoding rates in accordance with embodiments of the present invention.

FIG. 4 is a block diagram of an exemplary system 400 for encoding a video stream at a plurality of encoding rates in accordance with embodiments of the present invention. System 400 includes an accessor 402 for accessing a single video stream 410. A primary encoder 404 encodes a first frame of the single video stream at a first encoding rate. A rate determiner 406 determines an appropriate encoding rate and in one embodiment of the invention, the rate determiner 406 uses performance information to determine the appropriate encoding rate. A secondary encoder 408 encodes a second frame of the single video stream at a second encoding rate determined by the rate determiner 406. In one embodiment of the invention, the first and second video frames are un-sequential.

For example, suppose the single video stream is being encoded by the primary encoder 404 at a rate of 1 Mb/sec. The rate determiner 406 may receive information indicating that a packet has been lost. The rate determiner may decrease the encoding rate to 500 kb/s. The secondary encoder will then encode the next frame at the lower encoding rate. In one embodiment of the invention, the rate switching occurs at an S-frame of the single video stream 410. In one embodiment of the invention, an S-frame in the single video stream 410 is used to generate a new S-frame that allows an encoding rate switch.

Below is an exemplary algorithm for "off-line" encoding rate change. It is appreciated that the following algorithm is only an example and it is appreciated that many methods and/or algorithms could be used in accordance with embodiments of the present invention. The goal of the following algorithm is to determine the optimal set of parameters $\Delta$ and $\delta$, given total storage budget, and knowledge or assumed knowledge of the channel. For evaluation purposes, a burst-loss network is assumed with loss process according to a Gilbert (two-state Markov) model. The parameters p and q are the respective state transition probabilities from the delivery and loss states. The average packet loss ratio is given by $\pi=p/(p+q)$ and the average burst length is $1/q$.

Under the Gilbert loss model, the following can be denoted: $p(i)$, $i \geq 0$, the probability of having exactly I consecutive delivered packets between two lost packets. $P(i)$ is denoted as the probability of having at least I consecutive delivered packets following a lost packet. Specifically, for the commonly used Gilbert network model with parameters p and q, $p(i)$ and $P(i)$ can be defined as:

$$p(i) = \begin{cases} 1-q & \text{if } i=0 \\ q(1-p)^{i-1}p & o.w \end{cases} \quad (1)$$

$$P(i) = \begin{cases} 1 & \text{if } i=0 \\ q(1-p)^{i-1} & o.w. \end{cases} \quad (2)$$

$$q(i) = \begin{cases} 1-p & \text{if } i=0 \\ p(1-q)^{i-1}q & o.w. \end{cases} \quad (3)$$

$$Q(i) = \begin{cases} 1 & \text{if } i=0 \\ p(1-q)^{i-1} & o.w. \end{cases} \quad (4)$$

$$R(m,n) = \begin{cases} P(n) & \text{for } m=0 \text{ and } n \geq 0 \\ \sum_{i=0}^{n-m} p(i)R(m-1, n-i-1) & \text{for } 1 \leq m \leq n \end{cases} \quad (5)$$

$$S(m,n) = \begin{cases} Q(n) & \text{for } m=0 \text{ and } n \geq 0 \\ \sum_{i=0}^{n-m} q(i)S(m-1, n-i-1) & \text{for } 1 \leq m \leq n \end{cases} \quad (6)$$

$$h_j = \sum_{i=1}^{\Delta_{sp}-\delta_{sp}} \left\lceil \frac{r_j \Delta_{sp+i}, j\Delta_{sp+i-1}}{MTU} \right\rceil + \left\lceil \frac{r_{(j+1)\Delta sp, (j+1)\Delta sp-\delta sp}}{MTU} \right\rceil \quad (10)$$

$$K = \lfloor \Delta_{SP}/FPS*(1000*C/8)/s_{pkt} \rfloor \quad (11)$$

$$L(j) = \pi \sum_{i=0}^{h_j-1} R(i,K) + (1-\pi) \sum_{i=h_j}^{K} S(i,K) \quad (12)$$

Then, it can be shown that finding the optimal set of $\Delta$ and $\delta$ corresponds to finding the solution to the following subject to budget constraint.

$$\max_{\Delta_{sp},\delta_{sp}} \prod_{j=1}^{\lfloor \frac{N}{\Delta_{sp}} \rfloor} L(j) \quad (13)$$

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for encoding a plurality of video frames of a single data stream at a plurality of encoding rates comprising:
   accessing, performed by a computer system, a first video frame associated with said single data stream;
   encoding, performed by said computer system, said first video frame at a first encoding rate;
   accessing, performed by said computer system, a second video frame associated with said single data stream; and
   encoding, performed by said computer system, said second video frame at a second encoding rate within said single data stream, wherein said computer system includes one or more computers.

2. The method as described in claim 1 wherein said first video frame is an S frame.

3. The method as described in claim 2 wherein said S frame employs temporal prediction.

4. The method as described in claim 1 wherein said first encoding rate is greater than said second encoding rate.

5. The method as described in claim 1 wherein said first encoding rate is less than said second encoding rate.

6. The method as described in claim 1 wherein said first video frame is un-sequential to said second video frame.

7. The method as described in claim 1 wherein said second video frame is generated from an SP frame associated with said single data stream.

8. A method for streaming video from a host computer system to a plurality of client computer systems comprising:
   streaming from said host computer system a plurality of individual video streams to said plurality of client computer systems;
   determining performance information associated with one individual stream of said plurality of individual video streams; and
   switching from a first encoding rate at a first frame to a second encoding rate at a second frame within said one individual stream of said plurality of video streams in response to said performance information.

9. The method as described in claim 8 wherein said switching is performed at an S frame of said one individual stream of said plurality of video streams.

10. The method as described in claim 9 wherein said S frame employs temporal prediction.

11. The method as described in claim 8 wherein said first encoding rate is greater than said second encoding rate.

12. The method as described in claim 8 wherein said first encoding rate is less than said second encoding rate.

13. The method as described in claim 8 wherein said first frame is un-sequential to said second frame.

14. The method as described in claim 8 wherein said second frame is generated from an SP frame associated with one individual stream of said plurality of video streams.

15. A system for encoding video comprising:
   an accessor for accessing a first video frame from a single video stream;
   a primary encoder for encoding said first video frame at a first encoding rate;
   a rate determiner for determining a second encoding rate; and
   a secondary encoder for encoding a second video frame of said single data stream at said second encoding rate, wherein said second video frame is not sequential to said first video frame.

16. The system as described in claim 15 wherein said first video frame is a P video frame.

17. The system as described in claim 15 wherein said first encoding rate is greater than said second encoding rate.

18. The system as described in claim 15 wherein said first encoding rate is less than said second encoding rate.

19. The system as described in claim 15 wherein said first video frame is separated from said second video frame by an SP video frame in said single video stream.

20. The system as described in claim 15 wherein said second frame is generated from an SP video frame associated with said single data stream.

* * * * *